United States Patent
Nakazawa et al.

(10) Patent No.: US 7,930,708 B2
(45) Date of Patent: Apr. 19, 2011

(54) DEVICE CONTROL SYSTEM, DEVICE CONTROL METHOD, AND DEVICE CONTROL PROGRAM

(75) Inventors: Masatoshi Nakazawa, Nagano-ken (JP); Atsushi Sakai, Nagano-ken (JP); Masahiro Katagiri, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 990 days.

(21) Appl. No.: 11/457,073

(22) Filed: Jul. 12, 2006

(65) Prior Publication Data

US 2007/0027560 A1 Feb. 1, 2007

(30) Foreign Application Priority Data

Jul. 14, 2005 (JP) ................. 2005-205176

(51) Int. Cl.
- G06F 3/00 (2006.01)
- G06F 9/44 (2006.01)
- G06F 9/45 (2006.01)
- G06F 15/173 (2006.01)

(52) U.S. Cl. ........ 719/331; 709/224; 717/124; 717/128; 717/140

(58) Field of Classification Search .................. None
See application file for complete search history.

(56) References Cited

U.S. PATENT DOCUMENTS

| | | | | |
|---|---|---|---|---|
| 6,047,124 A * | 4/2000 | Marsland | ...... | 717/128 |
| 6,526,567 B1 * | 2/2003 | Cobbett et al. | ...... | 717/124 |
| 2002/0095310 A1 | 7/2002 | Kobayashi et al. | | |
| 2002/0199172 A1 * | 12/2002 | Bunnell | ...... | 717/128 |

FOREIGN PATENT DOCUMENTS

| JP | 2002207690 A | 7/2002 |
|---|---|---|
| JP | 2002318703 A | 10/2002 |

OTHER PUBLICATIONS

Microsoft Corporation, Microsoft POS for.NET Overview, <http://msdn.microsoft.com/library/en-us/ccl/html/b27b3555-a40c-4726-9bd1-12f970c6414e.asp>, pp. 1-3, 2006.

* cited by examiner

*Primary Examiner* — H. S. Sough
*Assistant Examiner* — Tuan Dao (57) ABSTRACT

A device control system, a device control method, and a device control program for rendering a trace function as a function added to a service object that provides the software application with an interface to a particular device based on the Microsoft .NET Framework. The device control system has a service object, a service object for tracing, and renders a trace function in a service object that provides a device interface to a software application based on the .NET Framework. The trace function can be rendered in the service object based on whether the trace function is disabled or enabled without modifying the software application.

19 Claims, 12 Drawing Sheets

POS for .NET

```
void FunctionA( )
{
    try
    {
        if("Is Trace enabled?")        ←──────────── asked every time
        {
            If enabled, run the Trace process.
        }
            :
            :
        the actual process
            :
            :
        if("Is Trace enabled?")        ←────────────┐
        {                                           │
            If enabled, run the Trace process.      │
        }                                           │
    }                                               │
    catch(Exception ex)                             │
    {                                               │
        if("Is Trace enabled?")        ←────────────┘
        {
            If enabled, run the Trace process.
        }
        throw ex;        ←──────────── the cause of the exception changes
    }
}
```

FIG. 12

DEVICE CONTROL SYSTEM, DEVICE CONTROL METHOD, AND DEVICE CONTROL PROGRAM

RELATED APPLICATIONS

Japanese patent application No.: 2005-205176, is hereby incorporated by reference in its entirety.

BACKGROUND OF THE INVENTION

1. Field of the Invention

The present invention relates to a device control system, a device control method, and a device control program that control by using an application one or more devices that form a system.

2. Description of the Related Art

Software for standardizing the interface between the host computer and devices in a POS system or other type of system comprising a host computer and peripheral devices based on predetermined specifications is available for developing software applications that render the specific functions of the system without knowing the types of devices that will be used in the system. A POS system is used as an example of such a system below.

OPOS (OLE for Retail POS) is an international standard (specification), and an OPOS-conforming object defines a standard interface for the devices constituting the terminal system in a POS system (referred to below as a POS terminal system). An OPOS object uses OLE (Object Linking and Embedding) control, which is supported by the Windows (R) operating system run by the host computer of the POS terminal system, to provide the application developer with API (application program interface) functions that make software application development easier. An OPOS-conforming object is referred to below as simply OPOS.

Java (R) POS is a program written in the Java (R) language, and is another standard (specification) for building POS systems. Java (R) POS objects provide the application developer with API functions that simplify developing software applications that are operating system independent. Java (R) POS objects are referred to below as JavaPOS.

POS for .NET is a standard (specification) for building POS systems using the Microsoft .NET Framework provided by Microsoft and POS for .NET objects provide the application developer with API functions that make software application development easier in the .NET Framework. POS for .NET objects are referred to below as POS for .NET, and the Microsoft .NET Framework is referred to as simply .NET (dot NET).

The ability to trace the operation of individual objects is needed for checking system operation and developing software applications that provide the POS system functions using the standardized software development tools based on a particular specification. This trace function is a function for compiling a log enabling the software developer to trace the operation of each object, and is not needed during normal use of the software application by the end user. Examples of object operation which might be logged by a trace function but is not limited to: executing methods, the result of executing a method, getting and setting properties, the results of getting and setting properties, posting events, and any operation which a programmer might reasonably assume would help the programmer understand the behavior of the object.

Japanese Unexamined Patent Appl. Pub. 2002-318703 teaches a method of implementing a trace function for device objects in the Java (R) POS system.

A device control exists between a device service and the software application in the JavaPOS system. A device control is an object that provides a particular device class, such as a printer or display, and controls the interface between the device class and the application.

A device service is an object that interfaces with a particular type of physical device, such as a particular printer model.

Software applications are referred to as simply applications below. A device control uses a service factory, which is a class for generating device service objects, to generate a device service object.

A service factory may be generated independently by the vendor of the device service, and whether the trace function is enabled or disabled may be determined from the generated service factory. Based on whether the trace function is enabled (on) or disabled (off) when the service factory generates a device service object, the service factory generates a trace service object, which is a device service for tracing, if the trace function is enabled, and generates a normal device service object if the trace function is disabled.

Figure 10:
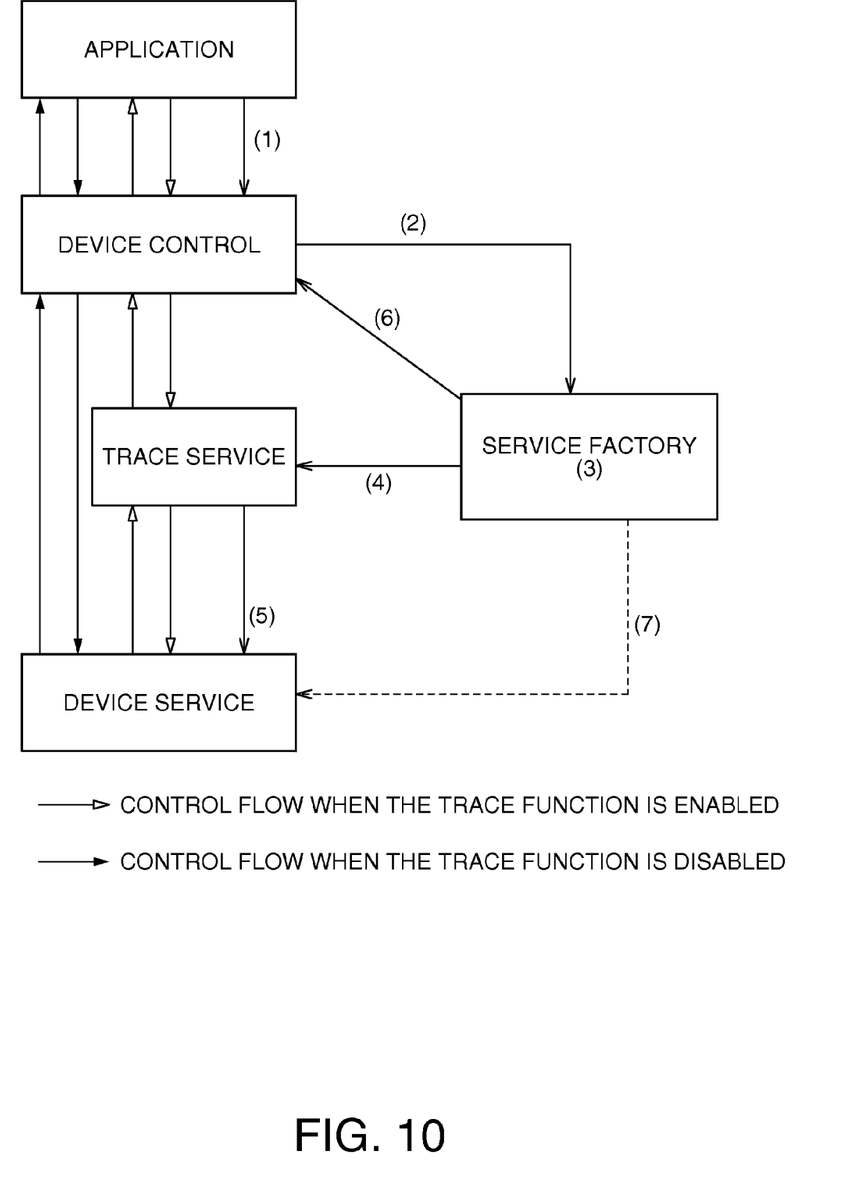
FIG. 10 describes implementing a trace function for device objects in the JavaPOS architecture.

FIG. 10 describes how the trace function for a device object is implemented in the JavaPOS architecture. As indicated by the arrows in FIG. 10, if the application executes an open method on the device service (indicated by (1) in FIG. 10), the device control generates a service factory object (2). The service factory then internally reads the enable/disable setting of the trace function (3). If the trace function is enabled, the service factory generates a trace service object (4), the trace service object generates a normal device service object (5) and the service factory returns the trace service object to the device control (6). However, if the service factory determines that the trace function is turned off, the service factory generates a normal device service object (7) and returns the device service object to the device control (6).

Because a device control is between the application and the device service, switching between the normal device service and the trace service, which is a device service for tracing the device service, when the application sends a command to the device service has no effect on the application. Therefore, as indicated by the white arrows showing flow control when the trace function is enabled and the black arrows showing flow control the trace function is disabled, the application controls the controlled device as desired by means of methods and properties and gets the result of controlling the device by means of events and properties.

OBJECTS OF THE INVENTION

A method of implementing a trace function for service objects in the POS for .NET framework has not been defined, however. Generating an instance of a service object in the POS for .NET framework is handled by modules provided by Microsoft. The Common Control Library (CCL) is the module provided by Microsoft. A service object in POS for .NET is an object corresponding to a JavaPOS device service, and is an object provided for each printer model or other such device.

CCL generates a service object instance based on service object identification information and service object location information. The service object identification information is provided by the application to the CCL. The service object location information is directory information representing the location of the service object in the assembly, and is stored in the registry.

When a trace service, which is a service object for tracing, is separately provided, the same problem presented by the trace function in the JavaPOS architecture occurs. More specifically, service object identification information or service object location information must be changed according to the enable/disable setting of the trace function in order to turn the trace function on and off. Furthermore, when the identification information for the service object passed from the application to the CCL changes, the application must be changed according to whether the trace function is on or off.

Figure 11:
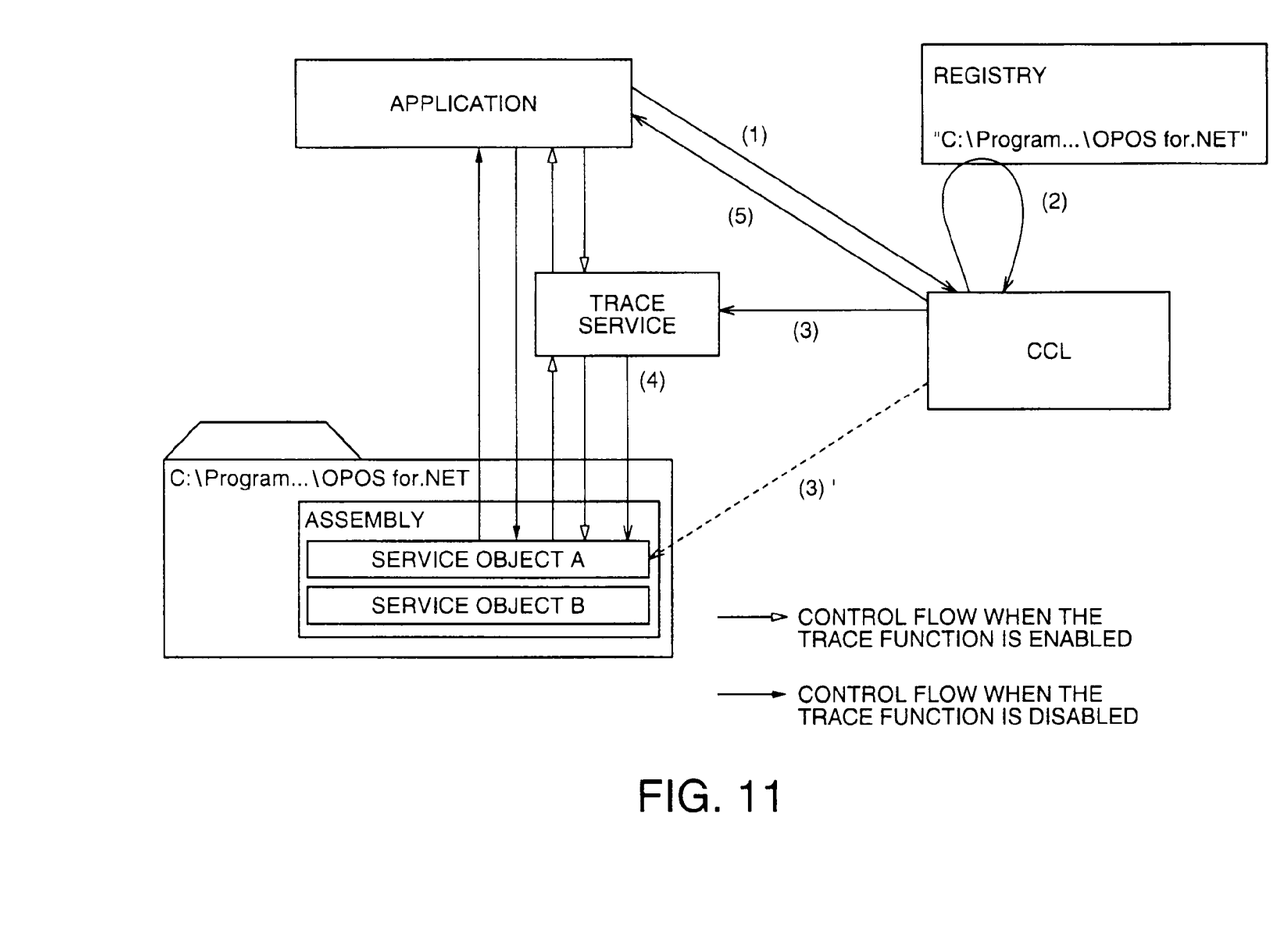
FIG. 11 describes problems with implementing a service object trace function in the POS for .NET Framework using the trace service.

FIG. 11 describes the problem implementing a service object trace function in the POS for NET framework using a trace service. As indicated by the arrows in FIG. 11, when the application asks the CCL to generate an instance of a service object represented by identification information A ((1) in FIG. 11), the CCL gets the directory information for the assembly storing the service object from the registry (2). Note that identification information A is the identification information for the service object, and the directory information for the assembly storing the service object is the service object location information.

Based on the service object identification information and service object location information, CCL determines if the trace function is enabled or disabled. If the CCL determines that the trace function is enabled, CCL generates an instance of the trace service (3), the trace service generates an instance of a normal service object (4), and the CCL returns the trace service instance to the application (5).

However, because the CCL is a Microsoft module the service object identification information or service object location information must be changed according to whether the trace function is enabled or disabled in order to turn the trace function on and off.

Figure 12:
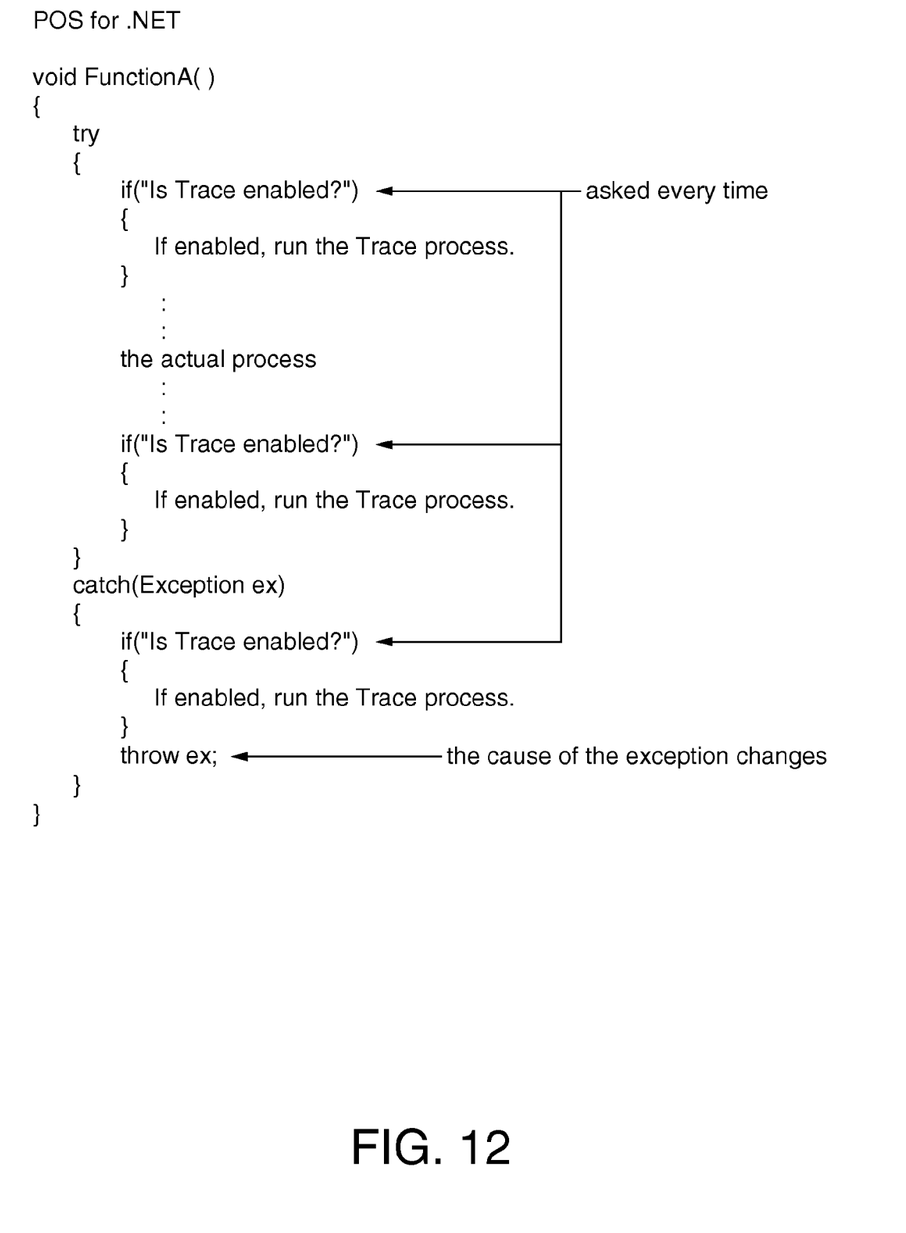
FIG. 12 shows an example of a program incorporating a trace function in the service object.

A trace function can also be built in to a normal service object without providing a service object for tracing. FIG. 12 shows sample code for building a trace function into the service object.

As shown in FIG. 12, whether tracing is enabled must be determined multiple times during the process. As a result, whether the trace function is enabled is also determined during normal operation when the trace function is disabled, and this lowers performance.

In addition, all errors are thrown as exceptions in the POS for .NET framework. The information reported as an exception includes information identifying where the error is. When the invoking object runs a process that gets all exceptions and then invokes the code again, the information showing where the error is gets overwritten with information showing where the code was reinvoked.

The present invention is directed to solving these problems, and an object of the invention is to provide a device control system, a device control method, and a device control program for implementing a trace function for service objects providing a device interface to the software application based on the .NET Framework.

SUMMARY OF THE INVENTION

The present invention solving these problems is described below.

To achieve this object, a device control system according to a first embodiment of the invention is a system for controlling a plurality of devices by means of an application. The plurality of devices referring to one or more devices. The system comprising a first object corresponding to each device for providing to the software application an interface to the device based on a predetermined specification; a second object corresponding to each device for providing the software application with added functionality for the first object; a storage for storing configuration information specifying whether the added functionality is enabled or disabled; and an object generator for generating the second object when the added functionality is enabled, and generating the first object when the added functionality is disabled, based on the configuration information.

The storage of the device control system thus comprised stores configuration information declaring whether the added functionality is enabled or disabled. Based on the configuration information, the object generator generates a first object that provides the software application with an interface to a particular device based on a predetermined specification, or generates a second object that provides the software application with additional functionality added to the first object for a particular device. More particularly, the second object is generated when the added functionality is enabled, and the first object is generated when the added functionality is disabled.

Added functionality can thus be rendered in the first object providing the software application with an interface to a particular device. This added functionality can be implemented in the first object without changing the software application according to whether the added functionality is disabled or enabled. Furthermore, because the added functionality is not programmed directly into the first object, added functionality can be achieved in the first object without suffering a drop in performance during normal operation when the added functionality is disabled.

A device control system according to another embodiment of the invention further comprises an editor for changing the added functionality from enabled to disabled or from disabled to enabled by changing the configuration information stored in the storage.

The device control system according to this embodiment of the invention thus enables using the editor to change the configuration information to reset the added functionality from enabled to disabled or from disabled to enabled.

If the user wants to apply the added functionality to the first object, this embodiment of the invention enables applying the added functionality to the first object that provides the software application with an interface to a particular device based on the predetermined specification by simply changing the configuration information from disabled to enabled.

In a device control system according to another embodiment of the invention the configuration information is information describing a location where the second object is defined when the added functionality is enabled, and is information describing a location where the first object is defined when the added functionality is disabled.

If the user wants to apply the added functionality to the first object, this embodiment of the invention enables applying the added functionality to the first object that provides the software application with an interface to a particular device based on the predetermined specification by simply changing the configuration information from disabled to enabled.

In a device control system according to another embodiment of the invention the second object corresponding to a device acquires information describing the location where the first object corresponding to the same device is defined, and based on the acquired information generates the first object.

Additional functionality can thus be rendered in the first object that provides the software application with an interface to a particular device based on a predetermined specification.

In a device control system according to another embodiment of the invention the second object acquires information describing the location where the first object is defined based on the configuration information and a predetermined rule, and based on the acquired information generates the first object.

Additional functionality can thus be rendered in the first object that provides the software application with an interface to a particular device based on a predetermined specification.

In a device control system according to another embodiment of the invention the added functionality is a function for tracing operation of the first object.

A trace function can thus be provided for a first object that provides a software application with an interface to a device based on a predetermined specification. This trace function can be implemented in the first object without changing the software application according to whether the trace function is disabled or enabled. Furthermore, because the trace function is not programmed directly into the first object, a trace function can be achieved in the first object without suffering a drop in performance during normal operation when the trace function is disabled.

In a device control system according to another embodiment of the invention the predetermined specification is the .NET Framework, and the first object is a service object.

A trace function can thus be provided for a service object that provides a software application with an interface to a device based on the .NET Framework. This trace function can be implemented in the service object without changing the software application according to whether the trace function is disabled or enabled. Furthermore, because the trace function is not programmed directly into the service object, a trace function can be achieved in the service object without suffering a drop in performance during normal operation when the trace function is disabled.

Furthermore, if the user wants to apply the trace function to the service object, this embodiment of the invention enables adding a trace function to the service object that provides the software application with an interface to a particular device based on the .NET Framework by simply changing the configuration information from disabled to enabled.

A device control method according to a further embodiment of the invention is a device control method for controlling one or a plurality of devices by means of a software application, the device control method comprising: a first object corresponding to each device for providing to the software application an interface to the device based on a predetermined specification; a second object corresponding to each device for providing the software application with added functionality for the first object; and an object generation step of generating the second object when the added functionality is enabled, and generating the first object when the added functionality is disabled, based on the configuration information. The device control method thus comprised achieves the same effect as the device control system of this invention.

The device control method preferably also has an editing step for changing the added functionality from enabled to disabled or from disabled to enabled by changing the configuration information. The object generation step generates the first object or the second object based on the configuration information changed by the editing step. The device control method thus comprised achieves the same effect as the device control system of this invention.

In a device control method according to another embodiment of the invention, the configuration information is information describing a location where the second object is defined when the added functionality is enabled, and is information describing a location where the first object is defined when the added functionality is disabled. The device control method thus comprised achieves the same effect as the device control system of this invention.

In a device control method according to another embodiment of the invention, the second object corresponding to a device acquires information describing the location where the first object corresponding to the same device is defined, and based on the acquired information generates the first object. The device control method thus comprised achieves the same effect as the device control system of this invention.

In a device control method according to another embodiment of the invention, the second object acquires information describing the location where the first object is defined based on the configuration information and a predetermined rule, and based on the acquired information generates the first object. The device control method thus comprised achieves the same effect as the device control system of this invention.

In a device control method according to another embodiment of the invention, the added functionality is a function for tracing operation of the first object. The device control method thus comprised achieves the same effect as the device control system of this invention.

In a device control method according to another embodiment of the invention, the predetermined specification is the .NET Framework, and the first object is a service object. The device control method thus comprised achieves the same effect as the device control system of this invention.

Another embodiment of the invention is a device control program for executing on a computer a process for controlling one or a plurality of devices, wherein the device control program executes on a computer a process for rendering the means of the device control system according to the present invention and the function of each object.

When the computer reads the program and executes the steps of the program, the computer achieves the same operation and effects as the device control system according to the present invention.

EFFECT OF THE INVENTION

The present invention enables implementing a trace function for service objects providing a device interface to software applications based on the .NET Framework. The trace function can be provided for service objects without changing the software application according to whether the trace function is enabled or disabled. Because the program does not build the trace function into service object itself, the trace function can be implemented for service objects without degrading performance during normal operation when the trace function is not enabled.

Furthermore, if the trace function is to be enabled for a service object in response to a user request, the trace function can be implemented for service objects providing a device interface to the software application based on the .NET Framework by only changing the configuration information to switch from the disabled to the enabled mode.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures. The following embodiments are only used to describe the present invention and do not limit the scope of the invention. It will be obvious to one with ordinary skill in the related art that these embodiments can be varied in many ways by modifying one or more of the elements described below, and all such variations are included in the scope of the accompanying claims.

Figure 1:
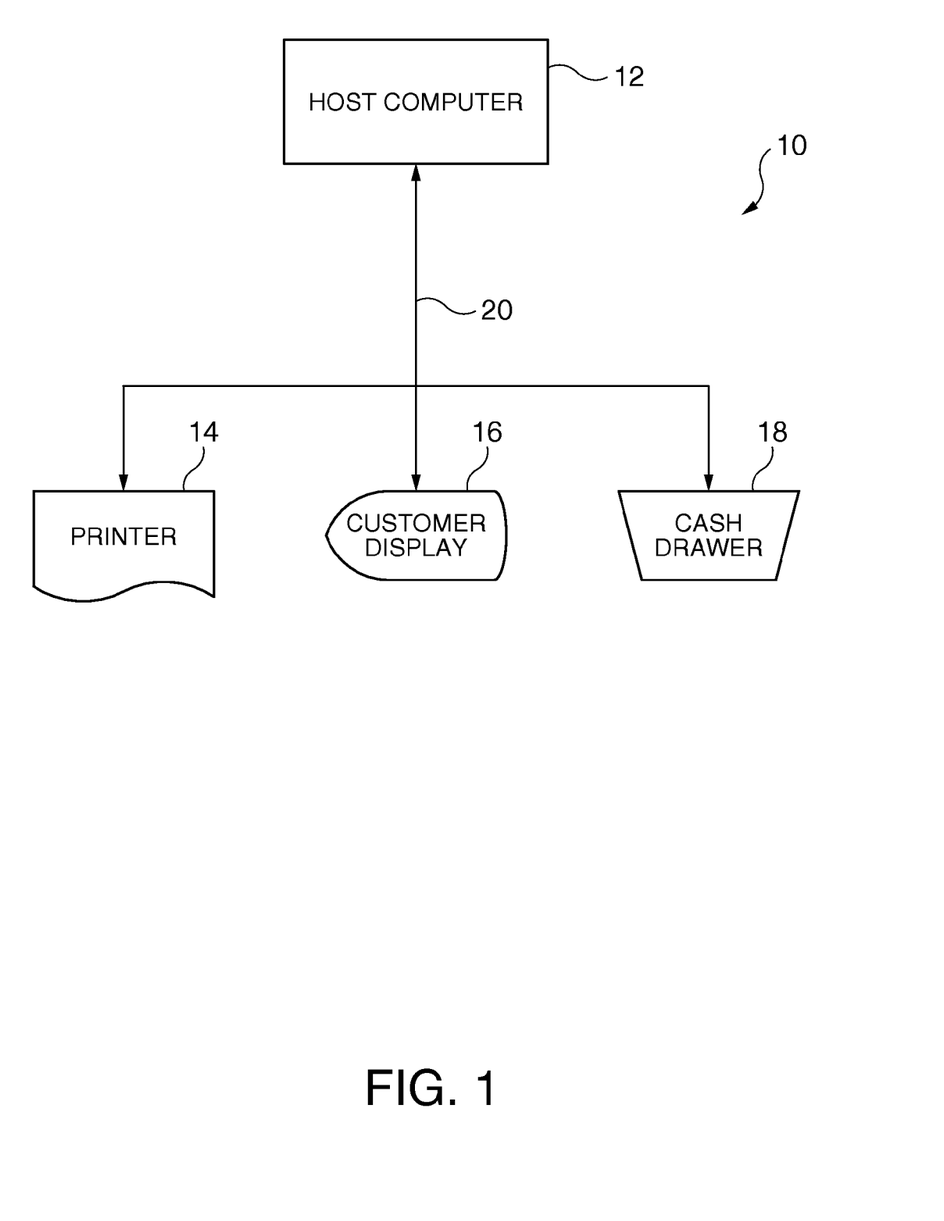
FIG. 1 is a schematic diagram showing an example of the configuration of a POS terminal system.

FIG. 1 shows an example of the configuration of a POS terminal system. As shown in FIG. 1 the POS terminal system 10 comprises a host computer 12, printer 14, customer display 16, and cash drawer 18.

The host computer 12 stores a software application for implementing the functions of the POS terminal system 10. The host computer 12 is connected by way of a communication bus 20 to a printer 14 for printing receipts and a journal, for example, a customer display 16 for displaying product information for a customer to view, and a cash drawer 18 for storing money and other instruments. The communication bus 20 uses the communication protocol of the selected communication medium, which could be a serial cable, a parallel cable, a network cable, a Universal Serial Bus (USB), or other medium.

Figure 2:
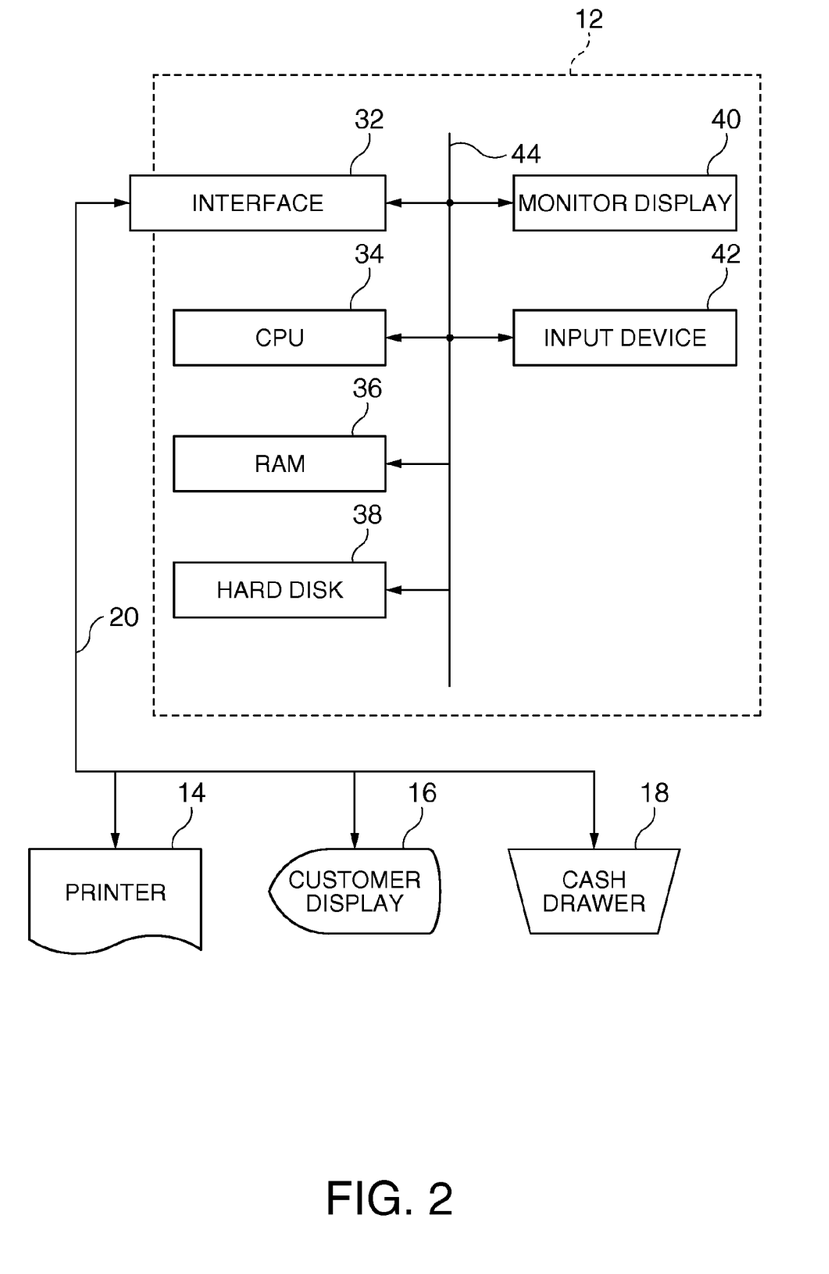
FIG. 2 is a schematic block diagram of the host computer 12 contained in the block diagram shown in FIG. 1.

FIG. 2 is a schematic block diagram of the host computer 12 shown in the block diagram shown in FIG. 1. As shown in FIG. 2, the host computer 12 has an interface 32 for connecting to the communication bus 20, a CPU (central processing unit 34, RAM (random access memory) 36 used as working memory for storing the program run by the CPU 34 and temporary work content, a hard disk 38 for storing the program run by the CPU 34 and other data, a display monitor 40 for presenting messages and prompts to the user, an input device 42 such as a mouse or keyboard for getting user input, and a bus 44 to which these parts are connected.

Figure 3:
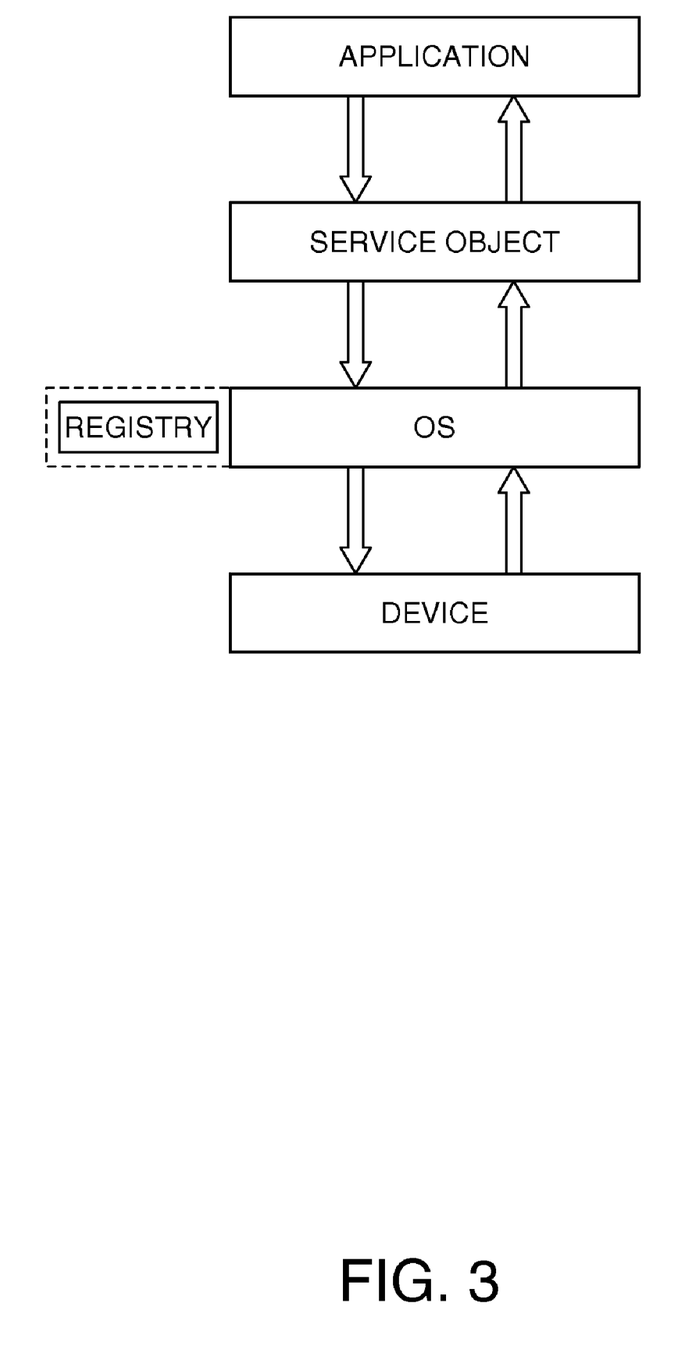
FIG. 3 shows the location of the POS for .NET service object in the POS terminal system.

FIG. 3 shows where a POS for .NET service object is positioned in the POS terminal system. As shown in FIG. 3, a POS for .NET service object is between the software application controlling the POS terminal system devices and the operating system, and provides a standard interface between the host computer and the devices based on predetermined specifications.

A separate service object is provided for each device such as a specific printer model, and controls the device through the operating system. The location information for the service object that is referenced to generate a service object is stored in the registry, and the registry is managed by the operating system.

The software application desirably controls the device being controlled by means of methods and properties, and gets the result of controlling the device by means of events and properties.

Figure 4:
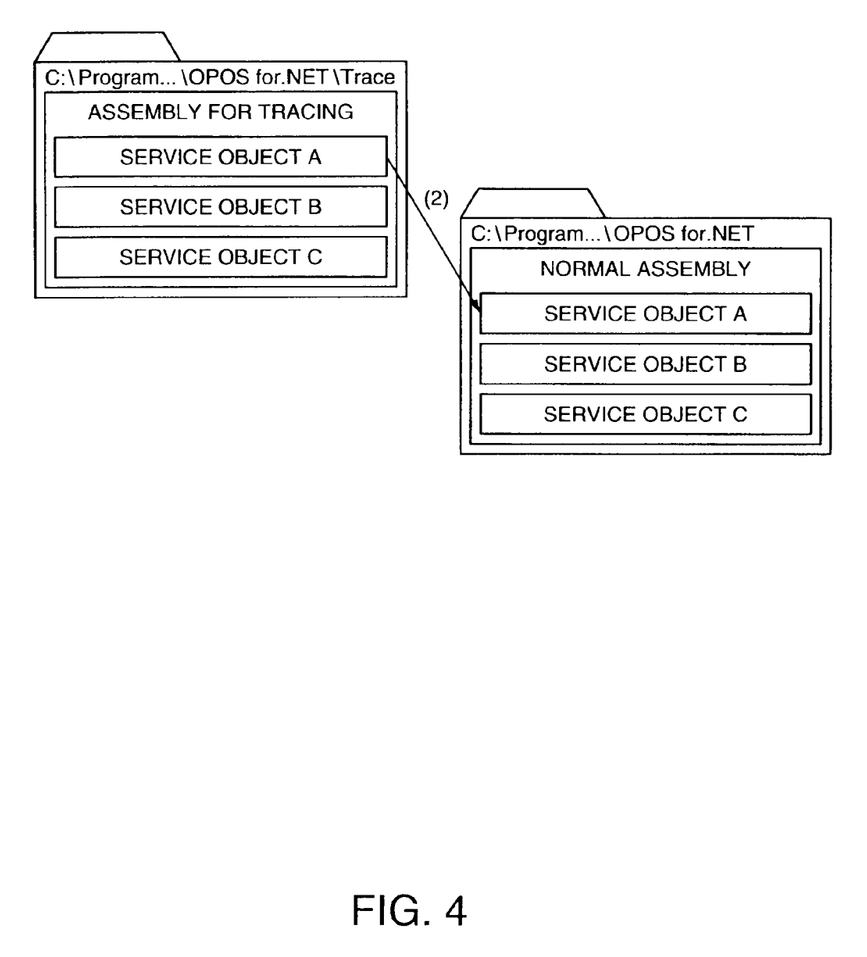
FIG. 4 describes a tracing service object.

FIG. 4 describes service objects for tracing. As shown in FIG. 4, the tracing service object identification information is the same as the identification information for the corresponding normal service object, and the tracing service object is generated substantially identically to the normal service object.

The assembly containing the tracing service objects is defined separately from the assembly containing the normal service objects, and the assembly containing the normal service objects and the assembly containing the tracing service objects are stored in different places. For example, when a service object is installed by an installer, the assembly containing the normal service objects and the assembly containing the tracing service objects are installed in different directories. If the assembly containing the normal service objects is installed in the directory "C:\Program...\OPOS for .NET," the assembly containing the tracing service objects is installed in the directory "C:\Program . . . \OPOS for .NET\Trace."

A tracing service object internally generates a normal service object ((2) in FIG. 4). The assembly containing the tracing service objects can therefore get the directory where the assembly containing the normal service objects is installed. A specific rule could control the relationship between the directory where the assembly containing the tracing service objects is installed and the directory where the assembly containing the normal service objects is installed, and the assembly containing the tracing service objects can know the directory where the assembly containing the normal service objects is installed based on this rule. This rule could, for example, declare that "the directory where the assembly containing the normal service objects is installed is the parent directory of the directory where the assembly containing the tracing service objects is installed." Alternatively, the location of the directory where the assembly containing the normal service objects is installed could be written in the registry. The tracing service object then reads the registry to get the directory where the assembly containing the normal service objects is installed.

Figure 5:
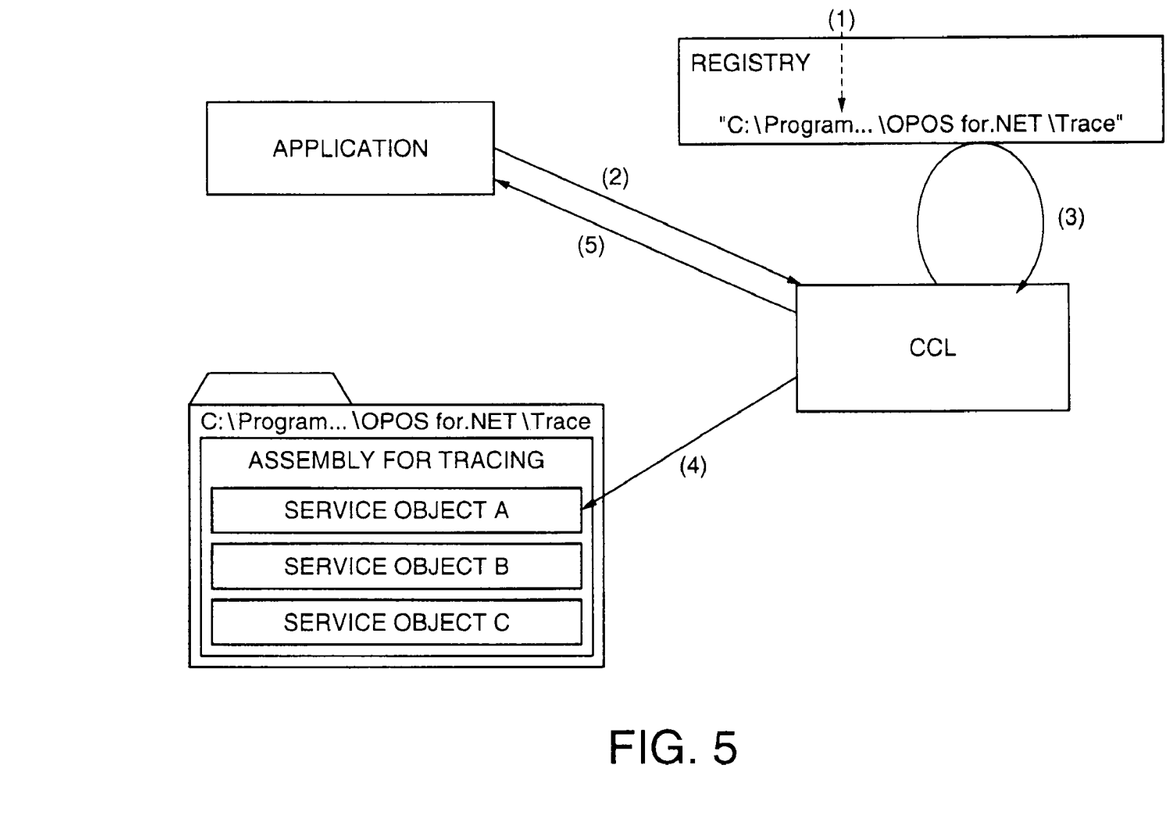
FIG. 5 describes generating a tracing service object.

Generating a tracing service object when the trace function is enabled is described next. FIG. 5 describes generating a tracing service object when the trace function is turned on.

As shown in FIG. 5, the location of the assembly containing the tracing service objects is first written in the registry ((1) in FIG. 5). In this example the directory where the assembly containing the tracing service objects is installed, that is, "C:\Program . . . \OPOS for .NET\Trace," is stored in the registry.

When the application sends a request to the CCL for the service object referenced by identification information A ((2) in FIG. 5), the CCL gets the location of the assembly containing the tracing service objects from the registry (3). A tracing service object identified as A is then generated from the assembly stored at the acquired address (4), and the resulting tracing service object is returned to the application (5).

Figure 6:
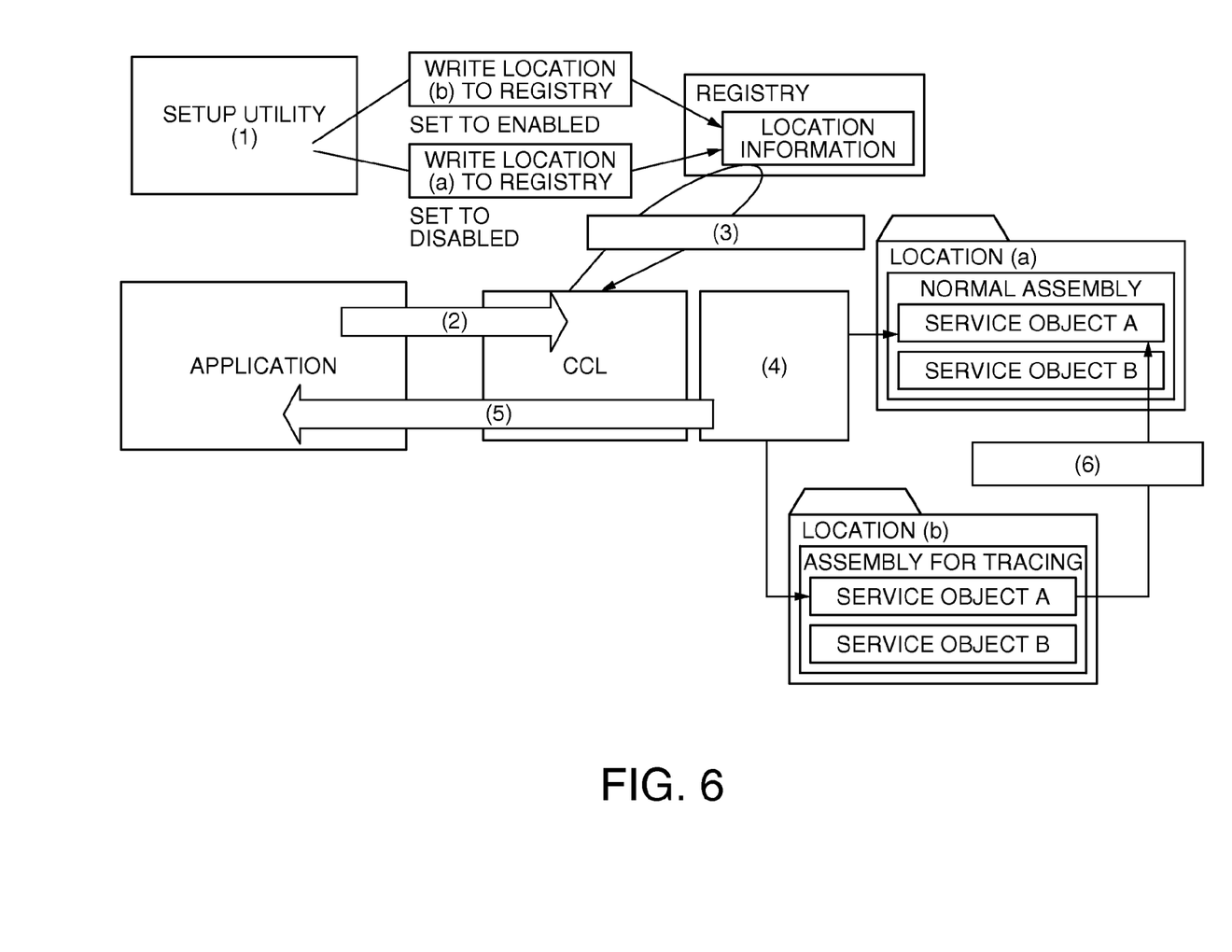
FIG. 6 describes a method of implementing a trace function for service objects in the POS for .NET Framework.

A method of implementing a trace function for service objects in the POS for .NET architecture using the tracing service object thus generated is described next. FIG. 6 describes a method of implementing a trace function for service objects in the POS for .NET architecture.

As shown in FIG. 6, whether the trace function is enabled or disabled is configured using the setup utility ((1) in FIG. 6)). If the trace function is enabled, the location (b) of the assembly containing the tracing service objects is stored as the location information in the registry. If the trace function is disabled, the location (a) of the assembly containing the normal service objects is stored in the registry.

Figure 7:
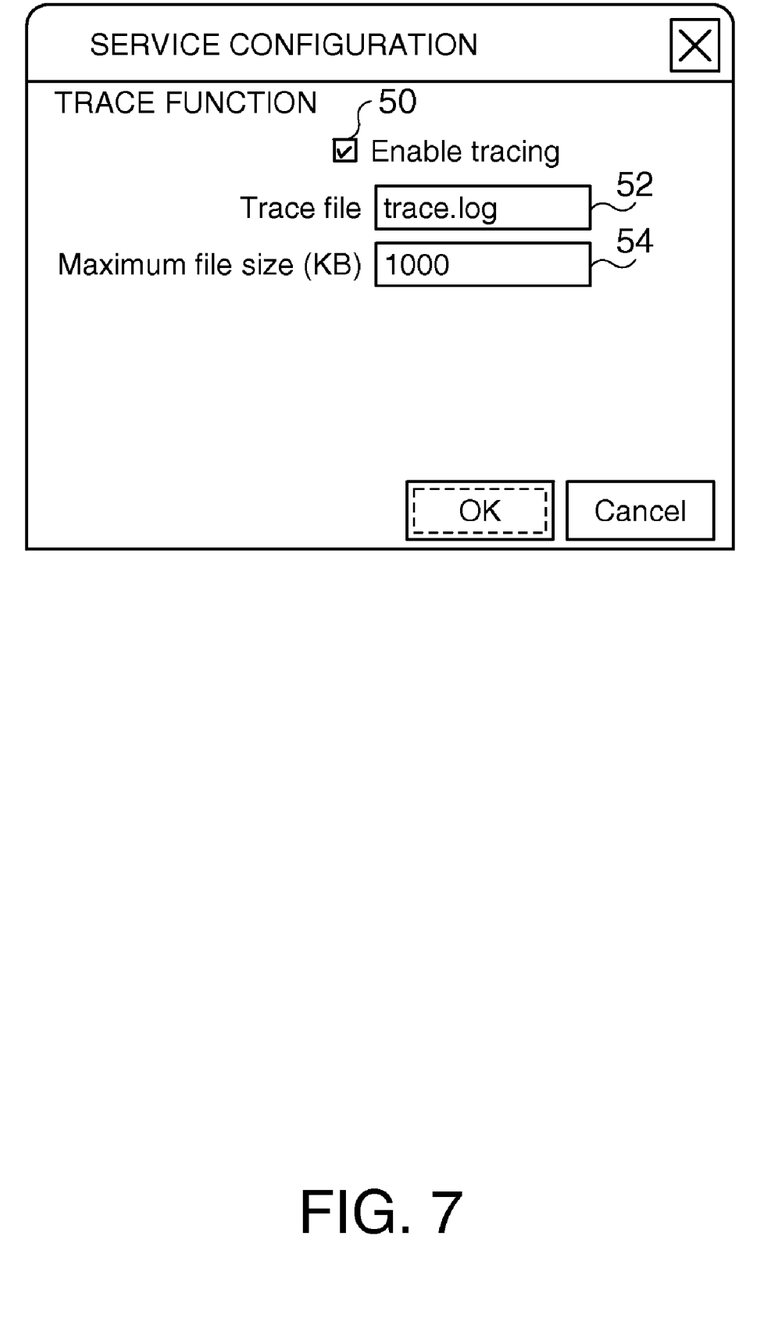
FIG. 7 shows an example of a dialog box for enabling and disabling the trace function in a setup utility.

FIG. 7 shows an example of a dialog box presented by the setup utility for turning the trace function on and off. When checkbox 50 is selected as shown in FIG. 7, the trace function is enabled. When the checkbox 50 is deselected and empty, the trace function is turned off. When the trace function is enabled, the filename and file size of the trace file for storing a log are entered in the name box 52 and file size box 54, respectively.

Returning to FIG. 6, when the application sends a request to the CCL for the service object referenced by identification information A ((2) in FIG. 6), the CCL gets the location of the assembly containing the tracing service objects from the registry (3). A service object identified as A is then generated from the assembly stored at the acquired address (4), and the resulting service object is returned to the application (5).

When the trace function is turned off, the location acquired by the CCL is (a), and a normal service object is generated from the assembly containing the normal service objects stored at location (a).

When the trace function is turned on, the location acquired by the CCL is (b), and a tracing service object is generated from the assembly containing the tracing service objects stored at location (b). In this embodiment the tracing service object gets the location (a) of the assembly containing the normal service objects based on a predefined rule, such as "the directory where the assembly containing the normal service objects is installed is the parent directory of the directory where the assembly containing the tracing service objects is installed," and then generates a normal service object from the assembly stored at location (a) (6).

Figure 8:
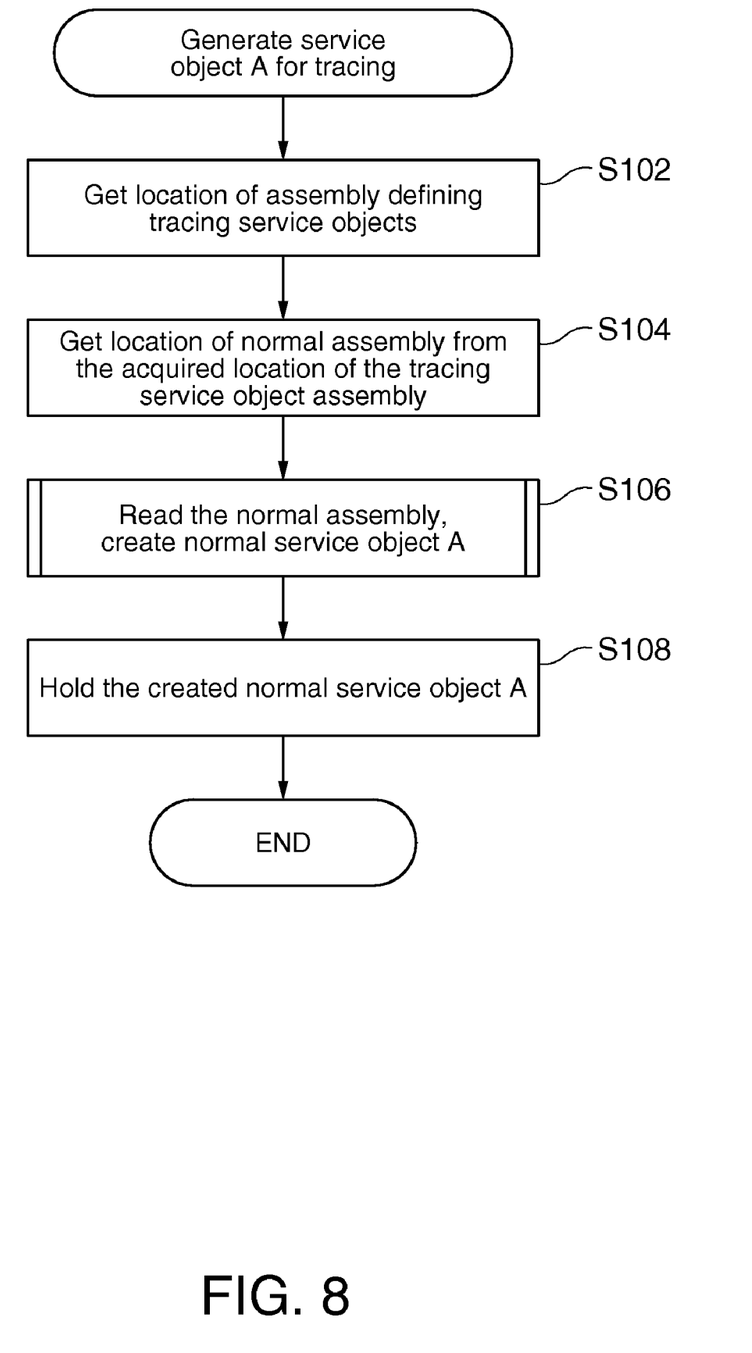
FIG. 8 is a flow chart of the process for generating a normal service object from the tracing service object.

The process of generating a normal service object from a tracing service object is described in detail next. FIG. 8 is a flow chart of the process for generating a normal service object from a tracing service object.

As shown in FIG. 8, when a tracing service object "A" is generated, the location where the assembly containing the tracing service object is stored is acquired (S102). The location where the assembly containing the normal service object is stored is then acquired based on the location where the assembly containing the tracing service object is stored (S104). The assembly stored at the acquired address is then read, and a normal service object "A" is generated (S106). The generated normal service object "A" is then held (S108) and the process ends.

Figure 9:
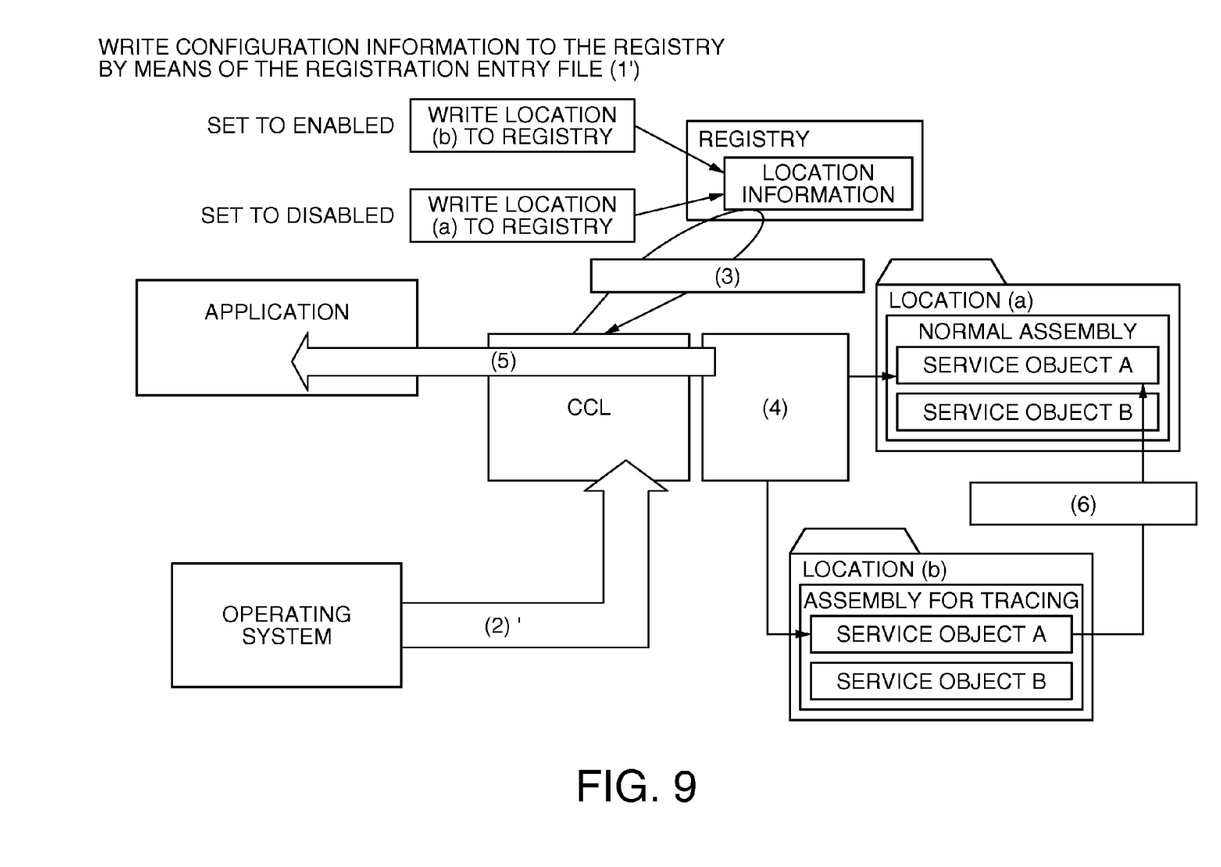
FIG. 9 describes a method of implementing a service object trace function in the POS for .NET Framework when a Plug-and-Play report is the trigger.

The method whereby the CCL is triggered by a request from an application to generate a service object is described in FIG. 6, but the CCL can also be triggered to generate a service object by a report from the Plug-and-Play function. FIG. 9 describes a method of implementing a trace function for service objects in the POS for .NET Framework using Plug-and-Play reports as the trigger.

The registration entry file stores the trace function setting, that is, whether the trace function is enabled or disabled, in the registry ((1') in FIG. 9). When the operating system controlling the Plug and Play feature posts an event reporting detection of a new device (2'), the CCL reads the registry to get the location information (3). The CCL then generates a service object from the assembly stored at the acquired location (4), and returns the generated service object to the application (5).

The trace function is implemented in this embodiment of the invention by running a device control program stored on the hard disk 38 of the host computer 12, but this program can be read into and run from RAM 36 from a data storage medium storing a program for executing the steps of this method.

The data storage medium is a tangible medium that could be semiconductor memory such as RAM or ROM, a magnetic storage medium such as a floppy disk or hard disk, an optical read-only storage medium such as a CD, CDV, LD, or DVD disc, a magnetically-writable, optically readable storage medium such as a magneto-optical disc, or any other computer-readable data storage medium that can be read electronically, magnetically, optically, or otherwise. The program could also be downloaded over a network and executed.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A method of implementing a trace functionality for software service objects, the method comprising:
storing configuration information specifying whether the trace functionality is enabled or disabled;
sending a request for an identified service object;
accessing a first location corresponding to said identified service object and generating an instance of said identified service object from a first assembly containing service objects stored at the first location, if the configuration information specifies that the trace functionality is disabled;
and accessing a second location corresponding to said identified service object and generating an instance of a tracing service object from a second assembly containing tracing service objects stored at the second location, if the configuration information specifies that the trace functionality is enabled, the instantiated tracing service object being identified as corresponding to said identified service object;
wherein:
the instantiated tracing service object determines said first location by means of a predefined rule specifying a fixed directional path leading from said second location to said first location, accesses the first assembly at the first location and generates an instance of non tracing said identified service object;
and said software service objects interface between an application and respective devices in a point-of-sale (POS) system.

2. The method of claim 1, further comprising inputting the configuration information.

3. The method of claim 1, wherein the configuration information includes information describing a location where the identified service object is defined.

4. The method of claim 1, wherein the interface provided by each of the service objects is based on a software platform on which various programming languages and library functionalities coexist.

5. The method of claim 1, wherein:
each service object in said first assembly has a unique service object identification (ID);

the correspondence between said first location and said identified service object is determined by accessing a registry listing a one-to-one correspondence between each service object, as identified by its service object ID, and its corresponding location;

the correspondence between said second location and said identified service object is determined by accessing said registry;

wherein said registry lists a correspondence between said identified service object and said first location if the configuration information specifies that the trace functionality is disabled, and said registry lists a correspondence between said identified service object and said second location if the configuration information specifies that the trace functionality is enabled.

6. The method of claim 1, wherein said identified service object is identified by a first service object identification (ID), and wherein said tracing service object is identified by said first service object ID.

7. The method of claim 1, wherein said tracing service object is a service object for tracing said identified service object.

8. The method of claim 1, wherein the method of claim 1 is executed within a Microsoft .NET Framework.

9. The method of claim 1, wherein said devices in said point-of-sale (POS) system are hardware devices.

10. The method of claim 1, wherein said fixed directional path offset is a fixed directory path offset leading from said second location to said first location.

11. The method of claim 1, wherein said fixed directional path offset is common to all tracing service objects in said second assembly, and leads from each tracing service object to its individually corresponding service object.

12. A computer readable storage medium encoded with a computer program for executing the method of claim 1.

13. A system for implementing a trace functionality for software service objects, the system comprising:
   a memory for storing configuration information specifying whether the trace functionality is enabled or disabled;
   a first service object generator for, in response to an identified service object request, accessing a first location corresponding to said identified service object and generating an instance of said identified service object from a first assembly containing service objects stored at the first location, if the configuration information specifies that the trace functionality is disabled; and
   a second service object generator for accessing a second location corresponding to said identified service object and generating an instance of a tracing service object from a second assembly containing tracing service objects stored at the second location, if the configuration information specifies that the trace functionality is enabled, the instantiated tracing service object being identified as corresponding to said identified service object;
   wherein:
   the instantiated service object determines said first location by means of a predefined rule specifying a fixed directional path leading from said second location to said first location, accesses the first assembly at the first location and generates an instance of said identified service object; and
   said software service objects interface between an application and respective devices in a point-of-sale (POS) system.

14. The system of claim 13, further comprising an editor for inputting the configuration information.

15. The system of claim 13, wherein the configuration information includes information describing the location where a particular service object is defined.

16. The system of claim 13, wherein the interface provided by each of the service objects is based on a software platform on which various programming languages and library functionalities coexist.

17. A method of implementing a trace functionality for software service objects, comprising:
   storing configuration information specifying whether a trace functionality for an identified service object is enabled or disabled, said identified service object having a first service object identification (ID) and being stored at a first address location;
   providing a tracing service object that is a service object for tracing said identified service object, said tracing service object having said first service ID and being stored at a second address location;
   providing a registry of service object ID's and their one-to-one corresponding address locations, said registry listing said first service object ID, wherein the address location within said registry corresponding to said first service object ID is said second address location;
   submitting said first service object ID as a request for generation of said identified service object;
   accessing said registry for determination of the address location corresponding to said identified service object, accessing said second address location as specified by said registry, and generating an instance of said tracing service object, wherein the instantiated tracing service object accesses said identified service object at said first address location, and generates an instance of said identified service object;
   and wherein said software service objects interface between an application and respective devices in a point-of-sale (POS) system.

18. The method of claim 17 wherein the address location within said registry corresponding to said first service object ID is said second address location if it is desired that said identified service object be traced, and the address location within said registry corresponding to said first service object ID is said first address location if it is desired that said identified service object not be traced.

19. The method of claim 17 wherein the instantiated tracing service object determines said first address location by means of a predefined, fixed directory offset path leading from said second address location to said first address location.

* * * * *